US011795673B2

(12) United States Patent
Abeygunawardana et al.

(10) Patent No.: US 11,795,673 B2
(45) Date of Patent: Oct. 24, 2023

(54) INTEGRATED UNDER SINK COMPOSTING SYSTEM

(71) Applicant: Haier US Appliance Solutions, Inc., Wilmington, DE (US)

(72) Inventors: Danister Abeygunawardana, Jeffersonville, IN (US); Gregory Scott Carr, Louisville, KY (US); Brent Alden Junge, Evansville, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 182 days.

(21) Appl. No.: 17/389,857

(22) Filed: Jul. 30, 2021

(65) Prior Publication Data

US 2023/0035699 A1   Feb. 2, 2023

(51) Int. Cl.
*E03C 1/266* (2006.01)
*B02C 18/00* (2006.01)

(52) U.S. Cl.
CPC ........ *E03C 1/2665* (2013.01); *B02C 18/0092* (2013.01)

(58) Field of Classification Search
CPC ... E03C 1/266; E03C 1/2665; B02C 18/0084; B02C 18/0092
See application file for complete search history.

(56) References Cited

U.S. PATENT DOCUMENTS

| 7,735,761 B2 * | 6/2010 | Koh ........................ C05F 17/20 241/606 |
| 7,954,739 B2 | 6/2011 | Shin-Ya |
| 9,499,963 B2 | 11/2016 | Ceru |
| 9,862,630 B2 | 1/2018 | Alvord |
| 10,066,377 B2 | 9/2018 | Kim |
| 2006/0037898 A1 * | 2/2006 | Choi ........................ C02F 1/725 422/243 |
| 2013/0118363 A1 * | 5/2013 | Santandrea ............. B30B 11/24 100/45 |

FOREIGN PATENT DOCUMENTS

| CN | 106320471 A | * | 1/2017 | ................ C02F 1/40 |
| CN | 210827714 U | | 6/2020 | |
| KR | 101305525 B1 | * | 9/2013 | |
| KR | 101346594 B1 | * | 1/2014 | |

* cited by examiner

*Primary Examiner* — Katrina M Stransky
*Assistant Examiner* — P Derek Pressley
(74) *Attorney, Agent, or Firm* — Dority & Manning, P.A.

(57) ABSTRACT

A composting machine that is positioned within a cabinet under a kitchen sink includes a macerator assembly comprising a plurality of macerator blades for shredding food waste. An extrusion assembly is positioned below the macerator assembly and includes a grinding barrel for receiving the food waste from the macerator assembly and an auger for extruding the food waste through an extrusion plate into a dryer assembly. The dryer assembly includes a compost chamber containing a mixing blade, a fan, and a heating element for generating compost from the food waste.

20 Claims, 5 Drawing Sheets

INTEGRATED UNDER SINK COMPOSTING SYSTEM

FIELD OF THE INVENTION

The present subject matter relates generally to waste management systems, and more particularly to a composting system that can be positioned within a cabinet under a kitchen sink.

BACKGROUND OF THE INVENTION

Landfills are commonly used sites for disposing of waste materials or garbage generated by humans. For example, trash collection systems typically collect waste from residential and commercial locations and transport that waste to landfills, where it is dumped and covered with dirt. Notably, food waste that is collected and deposited in a landfill undergoes an anaerobic decomposition process due to the lack of oxygen and can thus produce methane. Removing this food waste from the waste materials dumped in a landfill may significantly reduce the generation of methane, which is a very harmful greenhouse gas that is not environmentally friendly and may lead to global warming.

Moreover, food waste may be composted to provide useful soil and fertilizer for improved plant growth. In addition, composting produces carbon dioxide and water in an aerobic process due to the presence of oxygen, as opposed to relatively harmful methane. However, conventional composting systems are burdensome and inefficient. For example, food must be properly separated, collected, and removed from the home frequently to reduce smells in the house and facilitate the composting process. In addition, the solid waste must typically be separated from the liquid waste, and current systems for extracting solid waste are ineffective and may generate undesirable smells. Moreover, conventional composting methods take very long to generate useful compost, e.g., such processes may require months to convert the food waste into organic fertilizer. These conventional systems also require a large space to position and coordinate the various system components, making continued use of these systems burdensome.

Accordingly, an improved waste management system for facilitating disposal of food waste is desired. More specifically, a composting system that efficiently separates solid waste from liquid waste and prepares the solid waste for a compact and efficient composting process would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a composting machine is provided including a macerator assembly, an extrusion assembly, and a dryer assembly for generating compost. The macerator assembly includes a plurality of macerator blades rotatably mounted within the macerator housing, the macerator housing defining a macerator inlet for receiving food waste and a macerator outlet for discharging the food waste. The extrusion assembly includes a grinding barrel for receiving the food waste from the macerator outlet, an auger rotatably mounted within the grinding barrel, and an extrusion plate positioned at a discharge end of the grinding barrel for discharging the food waste. The dryer assembly includes a compost chamber having a dryer inlet positioned adjacent the discharge end of the grinding barrel and a dryer outlet, the dryer assembly further comprising a mixing blade for agitating the food waste to form compost that is discharged through the dryer outlet.

In another exemplary embodiment, a composting system is provided including a cabinet, a sink mounted at a top of the cabinet and defining a sink drain for receiving food waste, and a composting machine positioned under the sink. The composting machine includes a macerator assembly, an extrusion assembly, and a dryer assembly for making compost. The macerator assembly includes a macerator housing and a plurality of macerator blades rotatably mounted within the macerator housing, the macerator housing defining a macerator inlet fluidly coupled to the sink drain for receiving the food waste and a macerator outlet for discharging the food waste. The extrusion assembly includes a grinding barrel for receiving the food waste from the macerator outlet, an auger rotatably mounted within the grinding barrel, and an extrusion plate positioned at a discharge end of the grinding barrel for discharging the food waste. The dryer assembly includes a compost chamber having a dryer inlet positioned adjacent the discharge end of the grinding barrel and a dryer outlet, the dryer assembly further comprising a mixing blade for blending the food waste to form compost that is discharged through the dryer outlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 1:
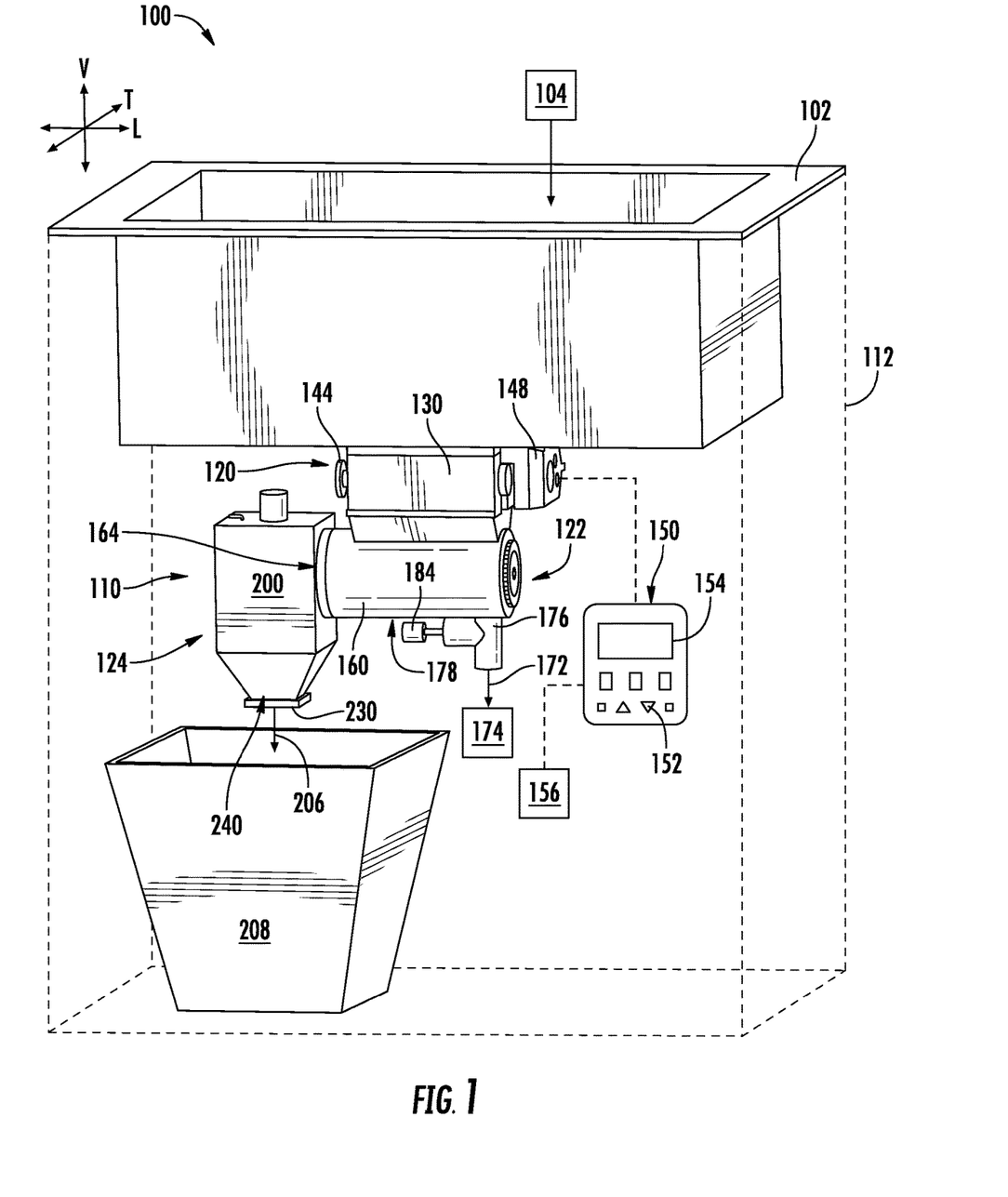
FIG. 1 provides a schematic view of a composting system according to an exemplary embodiment of the present subject matter.

Turning to the figures, FIG. 1 provides a perspective view composting system 100 according to an exemplary embodiment of the present disclosure. As explained in more detail below, composting system 100 may be used in any residential, commercial, or other setting for improving the disposal of liquid and food waste. More specifically, the composting system 100 described herein provides for environmentally friendly waste disposal and reuse with reduced production of the most harmful greenhouse gases, e.g., such as methane. Moreover, byproducts of food waste may be used for secondary beneficial purposes, such as being used as compost, fertilizer, mulch, or other organic planting material.

Specifically, as shown schematically in FIG. 1, composting system 100 generally includes a waste disposal source, such as a kitchen sink 102. In general, kitchen sink 102 may be configured for receiving food waste (e.g., as identified generally by reference numeral 104 in FIG. 1). In this regard, for example, kitchen sink 102 may be a kitchen sink in a residential setting. Instead of placing waste food into a trash bin for disposal in a landfill, consumers may use composting system 100 to dispose of such waste in a more environmentally friendly manner. In this regard, food waste 104 may be deposited directly into kitchen sink 102. In general, food waste 104 may include any suitable liquids, solids, or other food waste that is suitable for use in the composting process or which may otherwise be routed to an external drain, as described in more detail below.

As shown, food waste 104 may pass through a sink drain 106 of kitchen sink 102. Composting system 100 may further include a composting machine 110 that is generally configured to receive food waste 104 and sequentially and progressively break down food waste 104 into small particles suitable for composting. According to the illustrated embodiment, composting machine 110 may be sized and configured such that it may be positioned within a small storage space below kitchen sink 102. In this regard, in a common residential setting, kitchen sink 102 is positioned over a kitchen cabinet 112. According to the illustrated embodiment, composting machine 110 may be positioned entirely within kitchen cabinet 112, which may be suitably insulated to decrease noise and/or smells that might emanate from composting machine 110 during the composting process. As illustrated, composting machine 110 generally defines a vertical direction V, a lateral direction L, and a transverse direction T, each of which is mutually perpendicular, such that an orthogonal coordinate system is generally defined.

As explained briefly above, composting machine 110 is generally configured for receiving and breaking down food waste 104 during a composting process. Accordingly, composting machine 110 may include various processing components that break down food waste 104, add any necessary heat, remove air, or perform any other actions to facilitate the composting process. In this regard, referring now also to FIG. 2, composting machine 110 may generally include a macerator assembly 120, an extrusion assembly 122, and a dryer assembly 124 that operate collectively to facilitate a composting process. Each of these various processing components will be described below according to exemplary embodiments of the present subject matter. However, it should be appreciated that the illustrated exemplary embodiment is only intended to facilitate discussion of aspects of the present subject matter and is not intended to limit the present subject matter in any manner.

Figure 2:
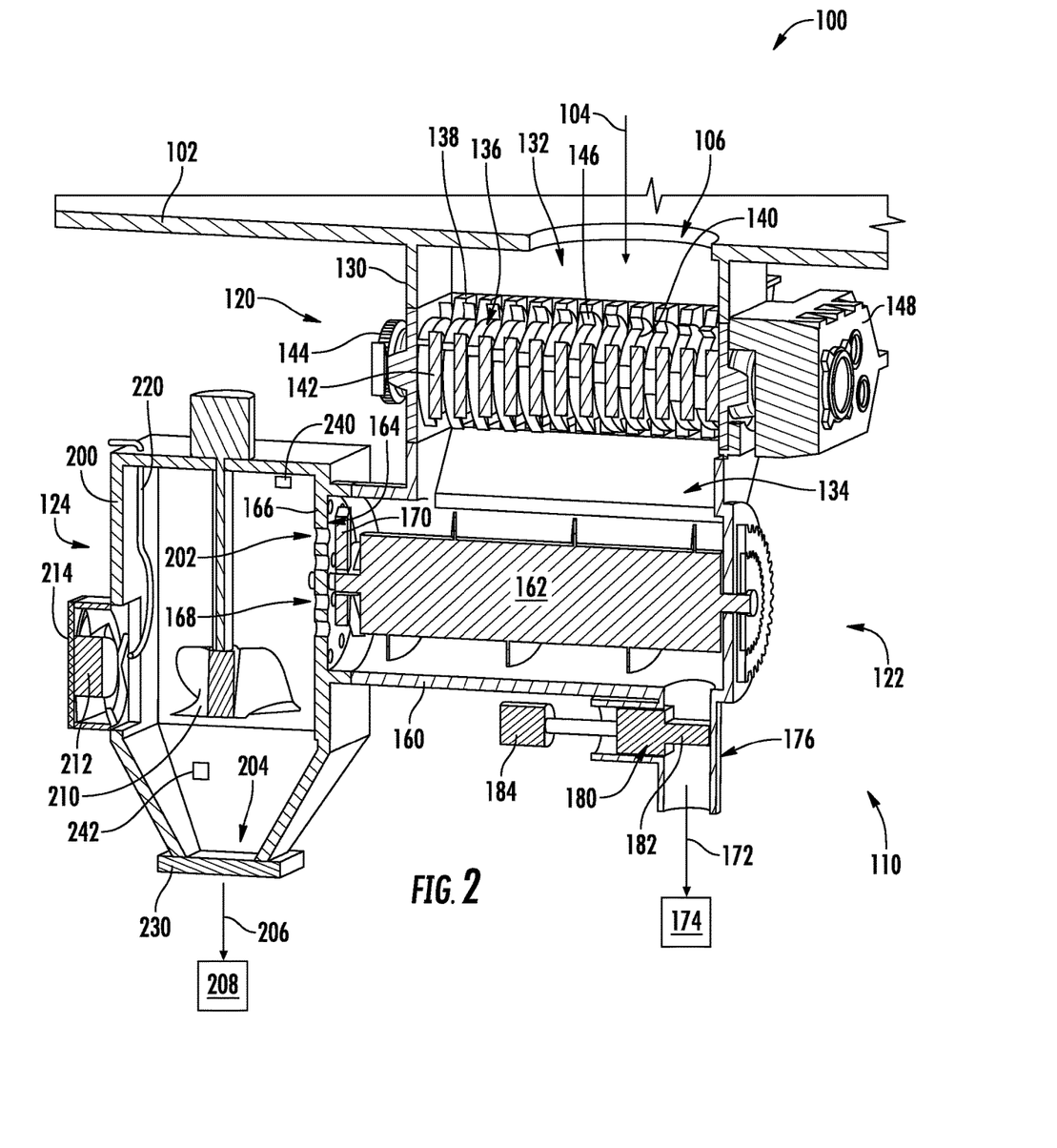
FIG. 2 provides a cross-sectional view of the exemplary composting system of FIG. 1 according to example embodiments of the present subject matter.
Figure 3:
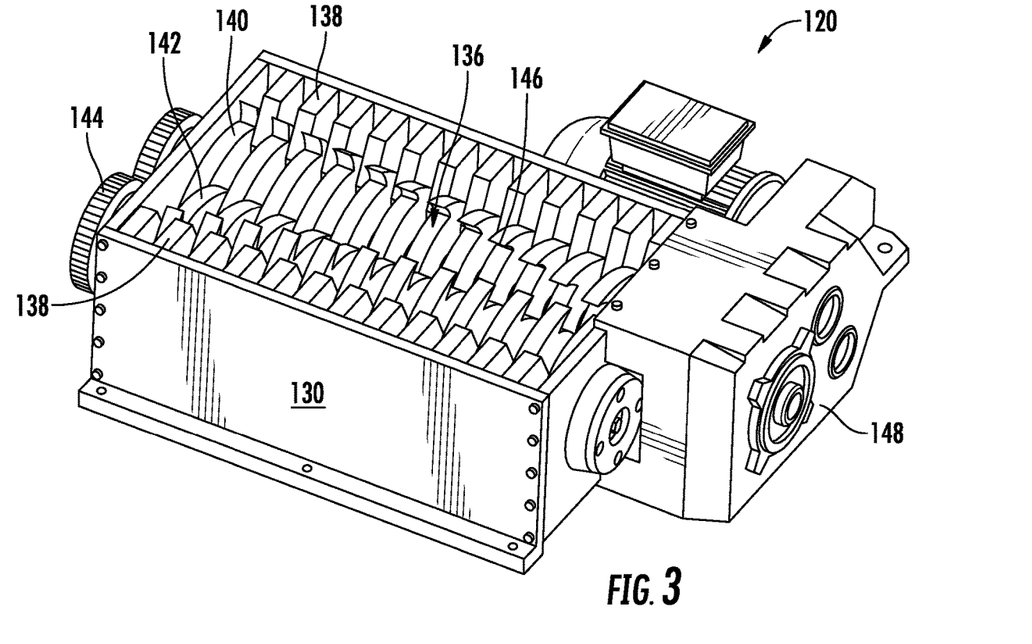
FIG. 3 provides a perspective view of a macerator assembly that may be used with the exemplary composting system of FIG. 1 according to example embodiments of the present subject matter.

As best illustrated in FIGS. 2 and 3, macerator assembly 120 generally includes a macerator housing 130 and defining a macerator inlet 132 that is fluidly coupled to sink drain 106 in a macerator outlet 134 for discharging processed food waste 104. In addition, macerator assembly 120 may include a plurality of macerator blades 136 that are rotatably mounted within macerator housing 130 and which are generally configured for chopping, crushing, macerating, or otherwise breaking down food waste 104 into smaller, more manageable food particles and waste. In addition, according to the illustrated embodiment, macerator assembly 120 may include a plurality of fixed blades 138 that are alternately positioned between rotating macerator blades 136.

Specifically, as best shown in FIG. 3, rotating macerator blades 136 include a first set of macerator blades 140 and the second set of macerator blades 142 that rotate in opposite directions and which are interweaved with each other. More specifically, first set of blades 140 and second set of blades 142 may each be coupled to a rotating shaft, and the respective shafts may be joined by a gear assembly 144 to ensure the blades move together. In addition, each of first set of blades 140 and second set of blades 142 may include one or more teeth (e.g., identified generally by reference numeral 146) for drawing food waste 104 down between first set of blades 140 and second set of blades 142.

As illustrated, composting machine 110 may include a motor assembly 148 that is mechanically coupled to macerator blades 136 for selectively rotating macerator blades 136 during a maceration process. Specifically, according to the illustrated embodiment, motor assembly 148 is mounted on a side of macerator housing 130 and may be mechanically coupled to first set of blades 140 (e.g., to the shaft coupled to such blades). Thus, as motor assembly 148 drives first set of blades 140, gear assembly 144 ensures that second set of blades 142 may rotate in the opposite direction and at substantially the same speed as first set of blades 140.

As used herein, "motor assembly" may refer to any suitable drive motor and/or transmission assembly for rotating the macerator blades 136. For example, motor assembly 148 may include a brushless DC electric motor, a stepper motor, or any other suitable type or configuration of motor. For example, motor assembly 148 may include an AC motor, an induction motor, a permanent magnet synchronous motor, or any other suitable type of AC motor. In addition, motor assembly 148 may include any suitable transmission assemblies, clutch mechanisms, or other components. According to an exemplary embodiment, motor assembly 148 may be operably coupled to a controller (described below), which is programmed to operate composting machine 110 as described herein.

Referring again to FIG. 1, composting machine 110 may include a control panel 150 that may represent a general-purpose Input/Output ("GPIO") device or functional block for composting machine 110. In some embodiments, control panel 150 may include or be in operative communication with one or more user input devices 152, such as one or more of a variety of digital, analog, electrical, mechanical, or electro-mechanical input devices including rotary dials, control knobs, push buttons, toggle switches, selector switches, and touch pads. Additionally, composting machine 110 may include a display 154, such as a digital or analog display device generally configured to provide visual feedback regarding the operation of composting machine 110. For example, display 154 may be provided on control panel 150 and may include one or more status lights, screens, or visible indicators. According to exemplary embodiments, user input devices 152 and display 154 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Composting machine 110 may further include or be in operative communication with a processing device or a controller 156 that may be generally configured to facilitate appliance operation. In this regard, control panel 150, user input devices 152, and display 154 may be in communication with controller 156 such that controller 156 may receive control inputs from user input devices 152, may display information using display 154, and may otherwise regulate operation of composting machine 110. For example, signals generated by controller 156 may operate composting machine 110, including any or all system components, subsystems, or interconnected devices, in response to the position of user input devices 152 and other control commands. Control panel 150 and other components of composting machine 110 may be in communication with controller 156 via, for example, one or more signal lines or shared communication busses. In this manner, Input/Output ("I/O") signals may be routed between controller 156 and various operational components of composting machine 110.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate machine operation. Alternatively, controller 156 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 156 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 156 may be operable to execute programming instructions or micro-control code associated with an operating cycle of composting machine 110. In this regard, the instructions may be software or any set of instructions that when executed by the processing device, cause the processing device to perform operations, such as running one or more software applications, displaying a user interface, receiving user input, processing user input, etc. Moreover, it should be noted that controller 156 as disclosed herein is capable of and may be operable to perform any methods, method steps, or portions of methods as disclosed herein. For example, in some embodiments, methods disclosed herein may be embodied in programming instructions stored in the memory and executed by controller 156.

The memory devices may also store data that can be retrieved, manipulated, created, or stored by the one or more processors or portions of controller 156. The data can include, for instance, data to facilitate performance of methods described herein. The data can be stored locally (e.g., on controller 156) in one or more databases and/or may be split up so that the data is stored in multiple locations. In addition, or alternatively, the one or more database(s) can be connected to controller 156 through any suitable network(s), such as through a high bandwidth local area network (LAN) or wide area network (WAN). In this regard, for example, controller 156 may further include a communication module or interface that may be used to communicate with one or more other component(s) of composting machine 110, controller 156, an external controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

According to the illustrated embodiment, food waste 104 that is macerated in the macerator assembly 120 passes through macerator outlet 134 into extrusion assembly 122. Similar to macerator assembly 120, extrusion assembly 122 is generally configured for chopping, crushing, macerating, or otherwise breaking down food waste 104 into smaller, more manageable food particles and waste. More specifically, extrusion assembly 122 may generally be configured to grind food waste 104 into smaller particles relative to macerator assembly 120. In addition, extrusion assembly 122 may be configured for draining and/or extracting at least a portion of the water or liquid within food waste 104.

As best illustrated in FIGS. 2 and 3 through 7, extrusion assembly 122 may generally include a grinding barrel 160 that receives macerated food waste 104 from macerator outlet 134. An auger 162 is rotatably mounted within grinding barrel 160. During operation, auger 162 may be rotated to grind food waste 104 and move food waste 104 toward a discharge end 164 of grinding barrel 160. Although no drive motor is illustrated in the figures, it should be appreciated that auger 162 may be coupled to any suitable drive motor and transmission assembly in a manner similar to macerator blades 136. Indeed, it should be appreciated that motor assembly 148 may include additional transmission assemblies or gear assemblies for simultaneously rotating macerator blades 136 and auger 162 during a composting process.

Figure 6:
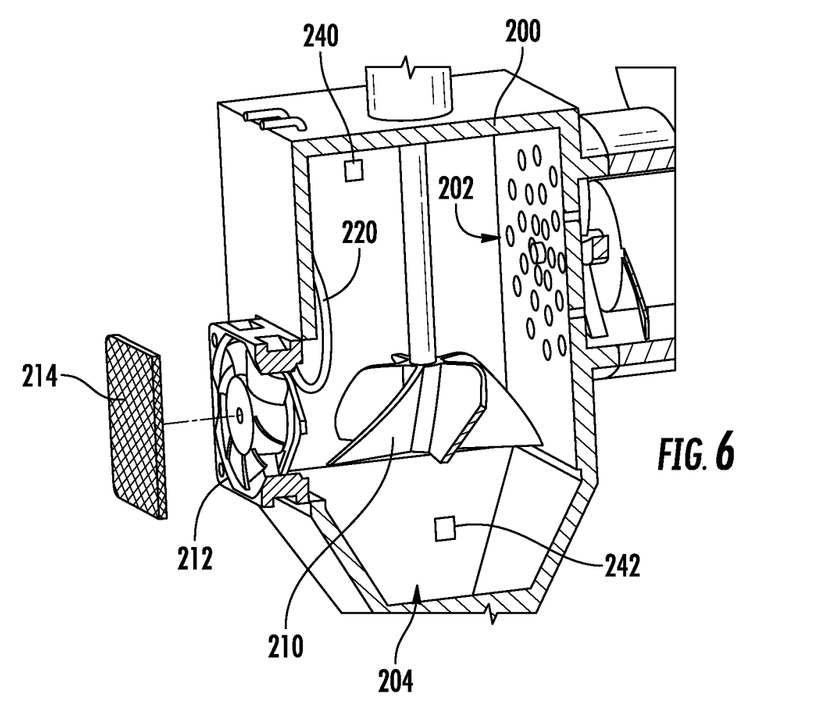
FIG. 6 provides a perspective view of a dryer assembly that may be used with the exemplary composting system of FIG. 1 according to example embodiments of the present subject matter.
Figure 7:
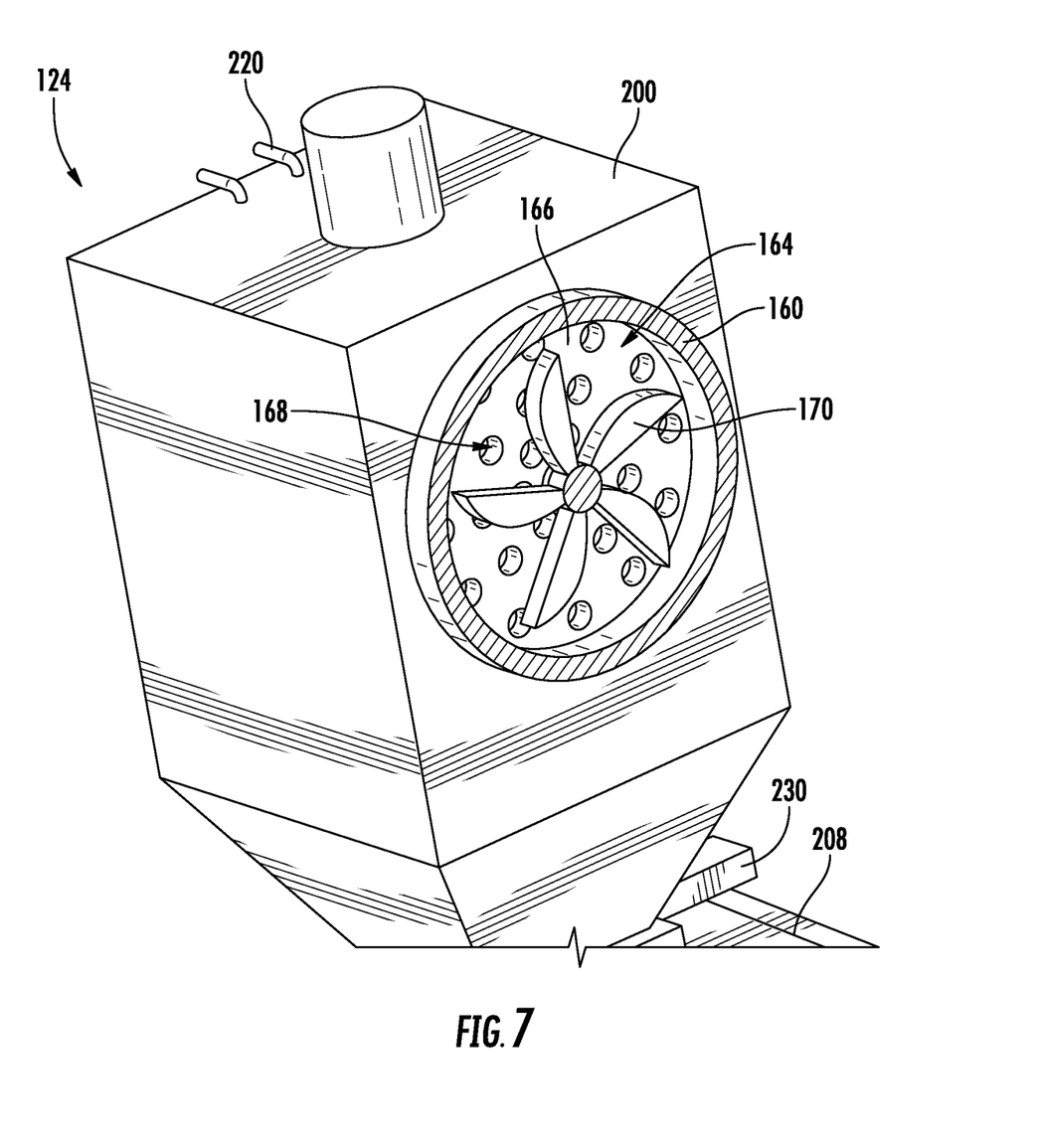
FIG. 7 provides a perspective view of a rotary blade that may be used with the exemplary composting system of FIG. 1 according to example embodiments of the present subject matter.

As best shown in FIGS. 6 and 7, extrusion assembly 122 may further include an extrusion plate 166 that is positioned at discharge end 164 of grinding barrel 160 for discharging food waste 104 from extrusion assembly 122. In this regard, extrusion plate 166 may define a plurality of apertures 168 through which food waste 104 may be extruded. More specifically, auger 162 may grind food waste 104 as it rotates while simultaneously pushing food waste 104 toward discharge end 164 such that it is extruded through apertures 168. In addition, according to the illustrated embodiment, extrusion assembly 122 may further include a rotating knife 170 that is mechanically coupled to auger 162 for periodically breaking the flow of extruded food waste 104. In this regard, as best illustrated in FIG. 7, rotating knife 170 may periodically sheer food waste 104 before it passes through apertures 168, e.g., to further process food waste 104 before it enters dryer assembly 124.

Referring again to FIGS. 1, 2, 4, and 5, food waste 104 may contain water or may be accompanied by other liquids that are poured down sink drain 106. These liquids are collectively referred to as wastewater or waste fluids (identified herein generally by reference numeral 172). Notably, this wastewater 172 may be undesirable during a composting process as it may generate mold, mildew, and/or other undesirable bacteria, or may otherwise negatively impact the composting process. Accordingly, it may be desirable to extract this wastewater 172 from food waste 104 prior to passing food waste 104 into dryer assembly 124. Accordingly, extrusion assembly 122 may include various features for collecting wastewater 172 and discharging that water through an external drain 174.

As illustrated, extrusion assembly 122 may further include a wastewater discharge port 176 that is defined proximate a bottom 178 of grinding barrel 160 along the vertical direction V. Wastewater discharge port 176 may generally be fluidly coupled to external drain 174 or another external water storage system. A wastewater control valve 180 may be operably coupled to wastewater discharge port 176 for regulating the flow of wastewater 172 from grinding barrel 160 to external drain 174.

Figure 4:
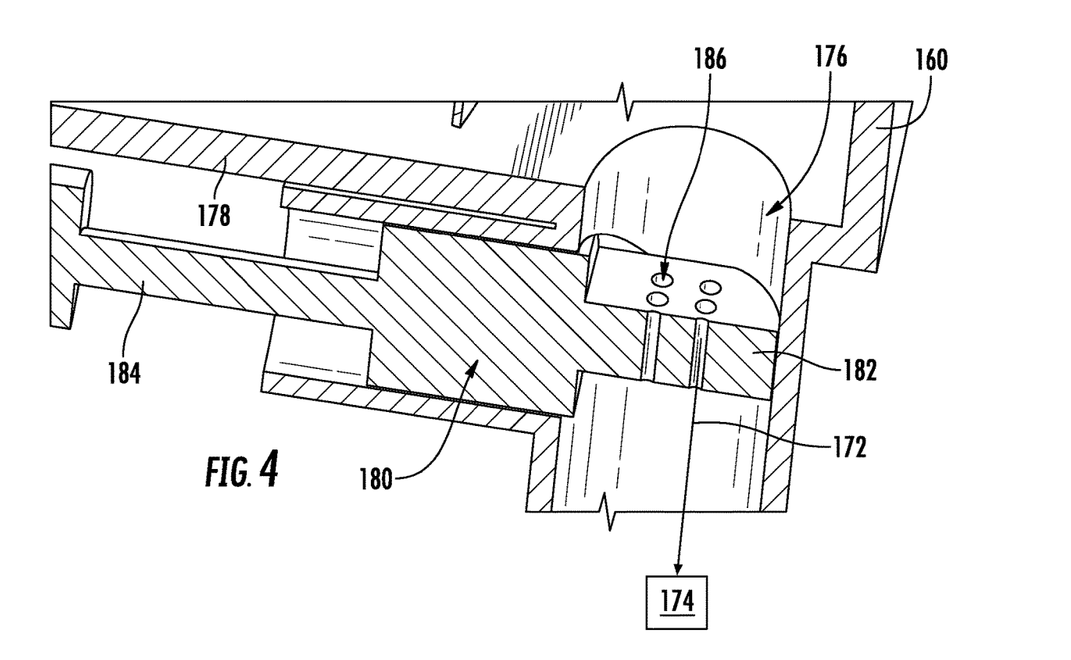
FIG. 4 provides a cross sectional view of a wastewater discharge port and a wastewater control valve in a closed according to example embodiments of the present subject matter.
Figure 5:
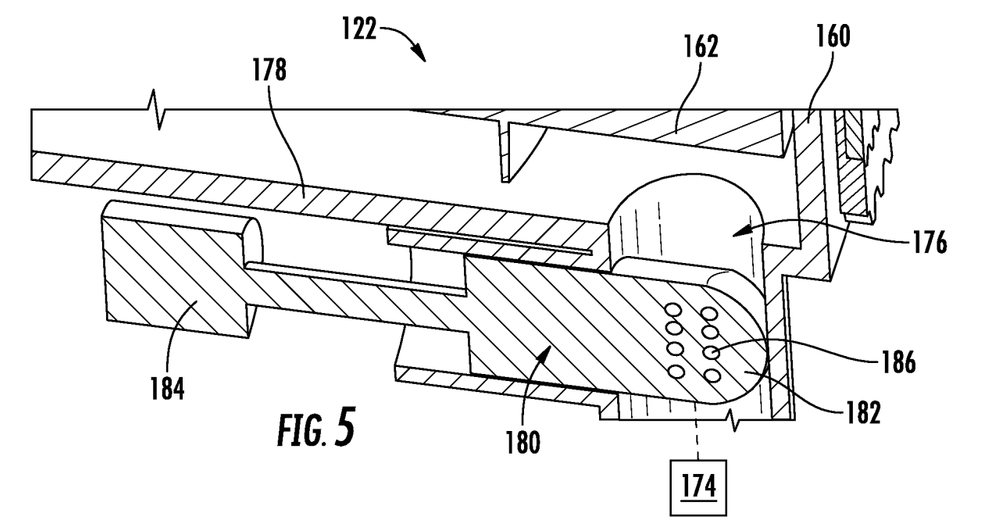
FIG. 5 provides a cross sectional view of the exemplary wastewater discharge port and the exemplary wastewater control valve in an open position according to example embodiments of the present subject matter.

Specifically, according to the illustrated embodiment, wastewater control valve 180 is generally movable between an open position (e.g., as shown in FIG. 5) and a closed position (e.g., as shown in FIG. 4) to selectively regulate the flow of wastewater 172 through wastewater discharge port 176. According to the illustrated embodiment, wastewater control valve 180 includes a valve body 182 that is rotatable within wastewater discharge port 176. A solenoid 184 may selectively rotate valve body 182 by approximately 90° to open and or clothes wastewater control valve 180. By contrast, according to alternative embodiments, the valve body 182 may be slidably mounted within wastewater discharge port 176 and solenoid 184 may slide valve body 182 between the open and closed positions.

Notably, according to the illustrated embodiment, the valve body 182 may further define one or more weep holes 186 through which a portion of the flow of wastewater 172 may pass to external drain 174 even when wastewater control valve 180 is in the closed position. In this manner, liquids that are poured down the sink drain 106 may drain to external drain 174 even when composting machine 110 is not in operation. It should be appreciated that extrusion assembly 122 and the wastewater discharge system may vary while remaining within the scope of the present subject matter.

According to the illustrated embodiment, dryer assembly 124 is positioned downstream of extrusion assembly 122 for facilitating a composting process. In this regard, referring now generally to FIGS. 1, 2, 6, and 7, dryer assembly 124 may include a compost chamber 200 having a dryer inlet 202 positioned adjacent discharge end 164 of grinding barrel 160. In this manner, macerated and grinded food waste 104 may be discharged into compost chamber 200. Compost chamber 200 may further define a dryer outlet 204 for discharging compost (e.g., identified herein generally by reference numeral 206) at the completion of a composting process. As best illustrated in FIG. 1, this compost 206 may be periodically discharged into a compost bin 208 that may be periodically emptied by a user of composting system 100.

In addition, dryer assembly 124 may further include a mixing blade or paddle 210 that is rotatably mounted within compost chamber 200 for agitating, blending, or otherwise mixing food waste 104 to form compost 206. In this regard, as shown, mixing blade 210, such as a rotary vane agitator, may be rotatably mounted within compost chamber 200 for agitating, churning, or otherwise mixing the contents within compost chamber 200. According to exemplary embodiments, composting system 100 may include further features for adding materials to facilitate the composting process, such as enzymes, heat, other organic material, or any other suitable material.

A fan 212 may be in fluid communication with compost chamber 200 for circulating air within compost chamber 200, e.g., to facilitate the composting process. According to the illustrated embodiment, fan 212 may further include an air filter 214 positioned over an inlet of fan 212 to reduce or minimize any undesirable smells associated with the composting process. In addition, according to the illustrated embodiment, dryer assembly 124 may include a heating assembly or heating element 220 for heating compost chamber 200 to facilitate the composting process. Notably, this process generates valuable fertilizer or soil amendment while minimizing the generation of methane gas that would otherwise be generated by food waste 104 if deposited in a landfill.

Notably, at the completion of a composting process, composting machine may have generated useful compost 206 that is stored in compost bin 208 and which may be removed by a user for various desirable uses. According to an exemplary embodiment, the discharge of compost 206 from compost chamber 200 into compost bin 208 may be automated by compost machine 110. In this regard, as illustrated in FIG. 1, dryer assembly 124 may include a discharge gate 230 that is positioned over dryer outlet 204 of compost chamber 200 and is generally movable between an open and closed position to selectively discharge compost 206 stored within compost chamber 200.

Notably, composting machine 110 may further include additional sensors to facilitate an improved composting process. For example, as best illustrated in FIG. 6, composting machine 110 may include a temperature sensor 240 that is positioned within compost chamber 200 for monitoring a chamber temperature. Similarly, composting machine 110 may include a moisture sensor 242 that is positioned within compost chamber 200 for monitoring a moisture content of compost 206. Controller 156 of composting machine 110 may be operably coupled to temperature sensor 240 and moisture sensor 242 for regulating the composting process.

Specifically, for example, controller 156 may be in operative communication with temperature sensor 240 and heating element 220. In addition, controller 156 may be configured to measure a chamber temperature within compost chamber 200 using temperature sensor 240 and may further operate heating element 220 to adjust the chamber temperature to a target temperature that is predetermined to facilitate an improved composting process. Similarly, controller 156 may be in operative communication with moisture sensor 242 and may be configured to measure the moisture content of compost 206 and terminate the composting cycle (e.g., by stopping the motor assembly 148 and opening discharge gate 230) when the moisture content reaches a target moisture content.

It should be appreciated that controller 156 provides improved versatility into the performance of any composting cycle. In this manner, composting cycles may begin at any suitable time and may be regulated in any suitable manner. For example, composting cycles may be programmed to start at a predetermined time of day, e.g., such as during nighttime when noise and/or smells generated during a composting process may be less noticeable by a user of composting system 100. In addition, controller 156 may directly manipulate the operation of various portions of composting system 100 to facilitate an improved compost process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A composting machine comprising:
   a macerator assembly comprising a macerator housing and a plurality of macerator blades rotatably mounted within the macerator housing, the macerator housing defining a macerator inlet for receiving food waste and a macerator outlet for discharging the food waste;
   an extrusion assembly comprising a grinding barrel for receiving the food waste from the macerator outlet, an auger rotatably mounted within the grinding barrel, and an extrusion plate positioned at a discharge end of the grinding barrel for discharging the food waste, wherein the extrusion assembly further comprises a wastewater discharge port defined proximate a bottom of the grinding barrel and being fluidly coupled to an external drain;
   a dryer assembly comprising a compost chamber having a dryer inlet positioned adjacent the discharge end of the grinding barrel and a dryer outlet, the dryer assembly further comprising a mixing blade for agitating the food waste to form compost that is discharged through the dryer outlet; and
   a wastewater control valve operably coupled to the wastewater discharge port and being moveable between an open position and a closed position for selectively regulating a flow of wastewater from the grinding barrel through the wastewater discharge port, wherein the wastewater control valve comprises a valve body that defines one or more weep holes through which a portion of the flow of wastewater may pass to the external drain when the wastewater control valve is in a closed position.

2. The composting machine of claim 1, wherein the macerator assembly further comprises:
   a plurality of fixed blades alternately positioned between the plurality of macerator blades.

3. The composting machine of claim 1, further comprising:
   a drive motor; and
   a gear assembly mechanically coupling the drive motor to the plurality of macerator blades and the auger.

4. The composting machine of claim 1, wherein the extrusion plate defines a plurality of apertures.

5. The composting machine of claim 1, wherein the extrusion assembly further comprises:
   a knife rotatably mounted adjacent the extrusion plate for separating the food waste as is passes through the extrusion plate.

6. The composting machine of claim 5, wherein the knife is mechanically coupled to the auger.

7. The composting machine of claim 1, wherein the dryer assembly comprises:
   a fan positioned in fluid communication with the compost chamber for circulating air within the compost chamber.

8. The composting machine of claim 7, wherein the dryer assembly comprises:
   an air filter positioned over an inlet of the fan.

9. The composting machine of claim 1, wherein the dryer assembly comprises:
   a heating element positioned within the compost chamber.

10. The composting machine of claim 9, wherein the dryer assembly comprises:
    a temperature sensor positioned in the compost chamber for monitoring a chamber temperature.

11. The composting machine of claim 10, further comprising: a controller in operative communication with the temperature sensor and the heating element, the controller being configured to:
    measure a chamber temperature within the compost chamber; and
    operate the heating element to adjust the chamber temperature to a target temperature.

12. The composting machine of claim 1, wherein the dryer assembly comprises:
    a moisture sensor positioned in the compost chamber for monitoring a moisture content of the compost.

13. The composting machine of claim 12, further comprising a controller in operative communication with the moisture sensor, the controller being configured to:
    measure the moisture content of the compost within the compost chamber; and
    terminate a composting cycle when the moisture content reaches a target moisture content.

14. The composting machine of claim 1, wherein the dryer assembly comprises:
    a discharge gate positioned over the dryer outlet of the compost chamber and being movable between an open position and a closed position.

15. The composting machine of claim 1, further comprising a controller configured to start a composting cycle at a predetermined time of day.

16. The composting machine of claim 1, wherein the composting machine is configured to fit within a cabinet under a kitchen sink.

17. A composting system comprising:
    a cabinet;
    a sink mounted at a top of the cabinet and defining a sink drain for receiving food waste; and
    a composting machine positioned under the sink, the composting machine comprising:
        a macerator assembly comprising a macerator housing and a plurality of macerator blades rotatably mounted within the macerator housing, the macerator housing defining a macerator inlet fluidly coupled to the sink drain for receiving the food waste and a macerator outlet for discharging the food waste;
        an extrusion assembly comprising a grinding barrel for receiving the food waste from the macerator outlet, an auger rotatably mounted within the grinding barrel, and an extrusion plate positioned at a discharge end of the grinding barrel for discharging the food waste, wherein the extrusion assembly further comprises a wastewater discharge port defined proximate a bottom of the grinding barrel and being fluidly coupled to an external drain;
        a dryer assembly comprising a compost chamber having a dryer inlet positioned adjacent the discharge end of the grinding barrel and a dryer outlet, the dryer assembly further comprising a mixing blade for blending the food waste to form compost that is discharged through the dryer outlet; and
        a wastewater control valve operably coupled to the wastewater discharge port and being moveable between an open position and a closed position for selectively regulating a flow of wastewater from the grinding barrel through the wastewater discharge port, wherein the wastewater control valve comprises a valve body that defines one or more weep holes through which a portion of the flow of wastewater may pass to the external drain when the wastewater control valve is in a closed position.

18. The composting system of claim 17, wherein the dryer assembly comprises:
    a heating element positioned within the compost chamber.

19. The composting system of claim 18, wherein the dryer assembly comprises:
    a temperature sensor positioned in the compost chamber for monitoring a chamber temperature.

20. The composting system of claim 19, further comprising: a controller in operative communication with the temperature sensor and the heating element, the controller being configured to:
    measure a chamber temperature within the compost chamber; and
    operate the heating element to adjust the chamber temperature to a target temperature.

\* \* \* \* \*